(12) United States Patent
Nadarajah

(10) Patent No.: US 7,830,459 B2
(45) Date of Patent: Nov. 9, 2010

(54) SYSTEM AND METHOD FOR PARALLEL CHANNEL SCANNING

(75) Inventor: Dinesh Nadarajah, Austin, TX (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 1279 days.

(21) Appl. No.: 11/346,641

(22) Filed: Feb. 3, 2006

(65) Prior Publication Data

US 2007/0182855 A1 Aug. 9, 2007

(51) Int. Cl.
*H04N 5/50* (2006.01)
*H04N 7/18* (2006.01)

(52) U.S. Cl. ..................... 348/732; 725/133
(58) Field of Classification Search ......... 348/563–565, 348/725, 731, 732, 73, 552–553; 725/126
See application file for complete search history.

(56) References Cited

U.S. PATENT DOCUMENTS

| | | | |
|---|---|---|---|
| 5,194,954 A | 3/1993 | Duffield | |
| 5,247,365 A | 9/1993 | Hakamada et al. | |
| 5,251,034 A | 10/1993 | Na | |
| 5,745,710 A * | 4/1998 | Clanton et al. | 725/60 |
| 6,742,187 B1 * | 5/2004 | Vogel | 725/126 |
| 6,784,945 B2 * | 8/2004 | Norsworthy et al. | 348/731 |
| 6,801,262 B2 | 10/2004 | Adrain | |
| 7,499,704 B1 * | 3/2009 | Bonner | 455/435.1 |
| 2006/0123455 A1 * | 6/2006 | Pai et al. | 725/133 |
| 2006/0150230 A1 * | 7/2006 | Chung et al. | 725/118 |

* cited by examiner

*Primary Examiner*—Paulos M Natnael
(74) *Attorney, Agent, or Firm*—G. Michael Roebuck

(57) ABSTRACT

A system and method are disclosed for receiving a group of video channels at a client device, selecting a display set from the group of channels, and sending a communication to a display for displaying each channel in the display set in parallel wherein each one of the channels in the display set is displayed in one of a plurality of picture in picture (PIP) displays for a predetermined time.

13 Claims, 8 Drawing Sheets

A FIRST LOGIC MODULE FOR RECEIVING THE PLURALITY OF CHANNELS FROM AN INTERNET PROTOCOL TELEVISION (IPTV) SYSTEM AT THE STB        701

A SECOND LOGIC MODULE FOR SELECTING A DISPLAY SET FROM THE PLURALITY OF CHANNELS AS THE DISPLAY SUBSET OF CHANNELS

A THIRD LOGIC MODULE FOR COMMUNICATING WITH A DISPLAY DEVICE FOR DISPLAYING EACH ONE OF THE CHANNELS IN THE DISPLAY SET IN PARALLEL IN A SEPARATE ONE OF A PLURALITY OF PICTURE IN PICTURE (PIP) DISPLAYS FOR A PREDETERMINED TIME.        702

A FOURTH LOGIC MODULE FOR ACCEPTING A USER INPUT FOR SELECTING A CHANNEL DISPLAYED IN ONE OF THE PLURALITY OF PIP DISPLAYS        703

A FIFTH LOGIC MODULE FOR SENDING A COMMUNICATION TO THE DISPLAY DEVICE FOR DISPLAYING THE SELECTED CHANNEL IN A NEW PIP DISPLAY        704

A SIXTH LOGIC MODULE FOR REMOVING THE SELECTED CHANNEL FROM THE PLURALITY OF CHANNELS FOR SELECTING THE DISPLAY SET.        705

SYSTEM AND METHOD FOR PARALLEL CHANNEL SCANNING

BACKGROUND OF THE DISCLOSURE

1. Field of the Disclosure

The present disclosure is related to automatic scanning of video channels.

2. Description of the Related Art

Advances in information technology and digital delivery infrastructure over the last 25 years have resulted in an explosion of digital content available to consumers. Hundreds of new programs and channels are now available for home viewing. New improvements to television delivery systems have proliferated including improvements in Internet protocol television (IPTV) networks, digital satellite television and cable television systems. Electronic program guides (EPGs) are now available to scroll through textual descriptions of the multiplicity of channels offered, however, even the EPGs consume considerable time to scan such a large number of channels. The EPG can be unwieldy when 300 plus channels are scrolled for review.

BRIEF DESCRIPTION OF THE DRAWINGS

For detailed understanding of the illustrative embodiment, references should be made to the following detailed description of an illustrative embodiment, taken in conjunction with the accompanying drawings, in which like elements have been given like numerals.

FIG. 7 is a depiction of logic modules on a processor in an illustrative embodiment of the present invention.

DETAILED DESCRIPTION OF AN ILLUSTRATIVE EMBODIMENT

Figure 1:
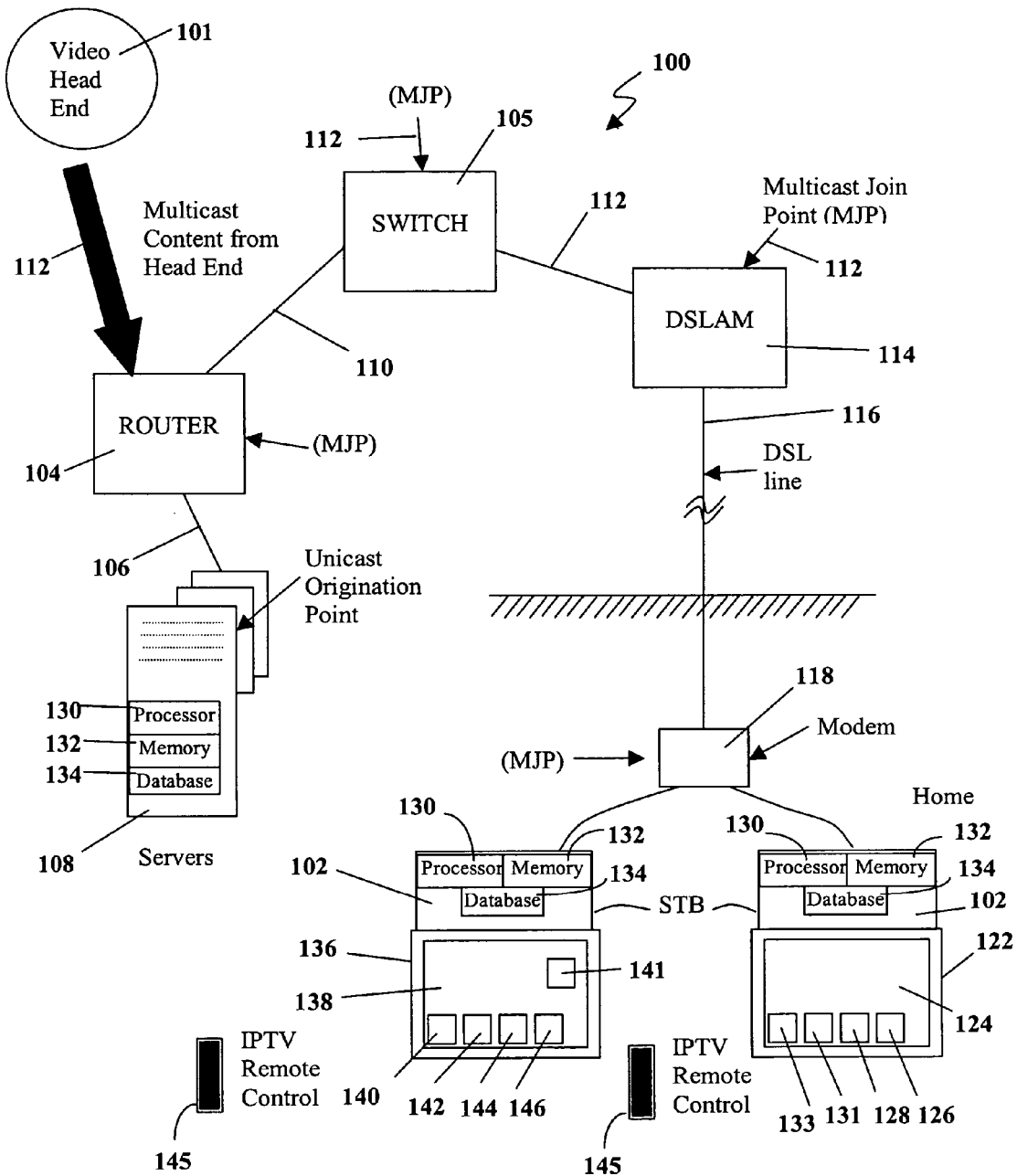
FIG. 1 is a schematic diagram depicting an illustrative embodiment showing an internet protocol television (IPTV) system and Set Top Box (STB) system for surfing or scanning the main video stream as well as the Picture-in-Picture (PIP) video streams provided to the STB by the IPTV system.

In view of the above, an illustrative embodiment is presented through one or more of its various aspects to provide one or more advantages, such as those noted below. In one embodiment a method is disclosed for scanning a plurality of video channels in parallel. The method includes receiving the plurality of video channels at a client device, selecting a display set from the plurality of channels, and sending a communication to a display for displaying each channel in the display set in parallel wherein each one of the channels in the display set is displayed in one of a plurality of Picture-in-Picture (PIP) displays for a predetermined time. In another aspect of a particular embodiment the method further includes selecting a second display set from the plurality of channels and sending a communication to a second display for displaying each channel in the display set in parallel wherein each one of the channels in the display set is displayed in one of a plurality of Picture-in-Picture (PIP) displays for a predetermined time.

In another aspect of a particular embodiment the client device is a-set top box (STB) wherein receiving further includes receiving a video stream at the STB from an internet protocol television (IPTV) server. In another aspect of a particular embodiment the display set is selected based on a scan mode, selected from the set consisting of channel type, favorites and recently viewed channels.

In another aspect of a particular embodiment the method further includes accepting a user input for selecting a channel displayed in one of the plurality of PIP displays, sending a communication to the display for displaying the selected channel in a new PIP display, and removing the selected channel from the plurality of channels for selecting a display set.

In another aspect of a particular embodiment the method further includes accepting a user input for selecting a channel displayed in one of the PIP displays and sending a communication to the display for displaying the selected channel in a main display.

In another aspect of a particular embodiment the method further includes sending a communication to the display for horizontally scrolling through the plurality of channels through the plurality of PIP displays. In another aspect of a particular embodiment the method further includes wherein a number of channels in the display set varies and a number of PIP displays in the plurality of PIP displays varies to match the number of channels in the display set.

In another aspect of a particular embodiment the system for scanning a group of video channels in parallel includes a set top box (STB) containing a processor. The processor further includes a first logic module for receiving the group of channels from an internet protocol television (IPTV) system at the STB, a second logic module for selecting a display subset from the group of channels as the display subset of channels, and a third logic module for communicating with a display device for displaying each one of the channels in the display set in parallel in a separate one of a plurality of picture in picture (PIP) displays for a predetermined time. In another embodiment, the processor further includes a fourth logic module for accepting a user input for selecting a channel displayed in one of the plurality of PIP displays, a fifth logic module for sending a communication to the display device for displaying the selected channel in a new PIP display, and a sixth logic module for removing the selected channel from the group of channels for selecting the display set. In another aspect of a particular embodiment the system further includes a computer readable medium embedded in a memory accessible to the processor, containing a computer program. The computer program further includes instructions to select the display set based on a scan mode from the set consisting of channel type, favorites and recently viewed channels.

In another aspect of a particular embodiment the computer program further includes instructions to provide a number of PIP displays to match a number of channels in the display set.

In another aspect of a particular embodiment a data structure for defining a plurality of channels for scanning the plurality of channels in parallel wherein the data structure includes a channel identifier field for identifying a channel in a video stream and a channel type for characterizing a channel category, as a member of the plurality of channels, wherein each one of the channels will be displayed concurrently in a different PIP display. In another aspect of a particular embodiment the data structure further includes a channel displayed in PIP field to indicate whether a channel is displayed in a PIP. The data structure further includes a channel selected for continuous scan field to indicate whether a channel has been selected for continuous display in a PIP and removed from the plurality of channels for selecting a display set.

In another aspect of a particular embodiment the data structure further includes a scan mode field for indicating a scan mode and a list of channels field for identifying a list of channels in the scan mode.

In one embodiment a method is disclosed for scanning a group of video content channels in parallel. The method includes selecting a display set from the plurality of channels at a server and sending the display set of channels to a client device in a video stream for displaying each channel in the display set of channels in parallel wherein each one of the channels in the display set is displayed in one of a plurality of Picture-in-Picture (PIP) displays for a predetermined time. In another aspect of a particular embodiment wherein the display set is selected based on a scan mode selected from the set consisting of channel type, favorites, and recently viewed channels.

In another aspect of a particular embodiment the system for scanning a plurality of video channels in parallel includes a server containing a processor and a database accessible to the processor. The processor further includes a first interface for selecting a display set from the plurality of channels as the display set of channels from the database for displaying concurrently each one of the channels in the display set of channels in parallel in a separate picture in picture (PIP) display for a predetermined time and a second interface for sending the display set of channels from the server to a client device. The server further includes a third interface for accepting a user input for selecting a channel from the display set, a fourth interface for sending the selected display channel to the client device, and a fifth element for removing the selected channel from the plurality of channels.

In an illustrative embodiment, a user controls the parallel scanning of a group of television channels or content. The term channels is used herein to refer to any video or audio content program or presentation made available from a video service provider or head end to a user at an integrated receiver decoder or a Set Top Box (STB). The STB can be set into a scan mode by depressing the UP channel button on a remote control and holding that button for a predetermined time, for example, 2 seconds. When the STB enters scan mode, the STB executes a 'Channel UP' request to the IPTV system for delivery of a group of channels and displays the channels in parallel in a group of PIP displays for a fixed duration. The channel change direction is incremental since the scan mode was entered by pressing the UP Channel key. The scan proceeds in the reverse direction if the scan mode had been entered using the DOWN Channel key. The scan stops when another key is pressed. If the OK key is pressed then the STB is tuned to the currently scanned channel. The same logic can be applied to a PIP stream whereby a PIP scan mode can be entered into by pressing and holding the UP or the DOWN ARROW keys instead of the UP or the DOWN CHANNEL keys.

Turning now to FIG. 1, in FIG. 1 an IPTV system 100 is illustrated in communication with STB 102. The STB 102 requests video streams containing video channels or programs from the IPTV system 100. The video streams contain channels for main or PIP display on the display. Video streams are transmitted over DSL line 116 and are received at the modem 118 and distributed to one or more STBs 102 inside of a business or residence. Video streams contain multiple programs typically associated with a channel number or program number in the video stream. As shown in FIG. 1 a set of communication interfaces are provided between each module and logic module embedded therein including but not limited to VHO 101, router 104, servers 108, switch 105, DSLAM 114, modem 118, set top box 102, processor 130, memory 132, database 134, and display 136. A set of logic modules are also provided for performing the methods described herein.

Multicast content 112 from a head end or video provider is provided to router 104. Router 104 also receives unicast content from servers 108. Servers 108 communicate with router 104 via communication link 106. Multicast and unicast content from router 104 are communicated to a switch 105 (also a multicast joint point (MJP)) via communication link 110. Switch 105 communicates to a DSLAM 114 via communication link 112. The DSLAM is also a MJP. MJPs are also provided at switch 105 and DSLAM 114. A DSL line 116 communicates multicast and unicast video streams to modem 118. The modem 118 distributes the video stream to STBs 102. Each STB contains a processor 130, memory 132, and database 134. Each STB within a household is associated with a particular video display unit 122 or 136. The sTB sends communications to the display unit (device) to display video in the main display and PIPs. Each video display unit has a main video display area 124 or 138. Within each main display area 124 and 138 are smaller PIP display areas as shown in FIG. 1 and indicated by reference numerals 126, 128, 131, 133, 140, 142, 144, and 146. Each STB 102 has an associated IPTV remote control (RC) 145.

When a channel scan is initiated by a user, a user at an RC 145 sends a signal to the STB. The STB in turn sends unicast or multicast join requests to the IPTV system 100 requesting a plurality of television programs or channels to be delivered to the STB for scanning. In an illustrative embodiment a group of 16 PIP low resolution channels or programs are delivered in a group of Motion Picture Expert Group (MPEG)-4 Part 10 (also referred to as H.264) video streams to the STB for parallel scanning. H.264 or MPEG-4 Part 10 is a digital video cable standard, which is noted for achieving very high data compression. A higher resolution background channel can also delivered in an MPEG-4.10 stream. One of the 16 channels can be displayed in the main display area 138 and the remaining channels scanned in parallel on PIP displays 140, 142, 144, and 146. In an illustrative embodiment a first channel can be displayed in main display area 138 and the remaining channels be cyclically scanned in parallel in the four PIP display areas within the main display area. For example, channel 17 could be displayed in the main display area 138. A scan cycle for channels 1-16 could be performed as follows. Channels 1 through 4 would be displayed in parallel in PIP display areas 140, 142, 144, and 146 for a predetermined period of time, for example, 5 seconds. Channels 5 through 8 would be displayed in the same PIP areas for a predetermined period of time (5 seconds). Channels 9 through 12 would then be displayed and channels 13 through 16 displayed. The scan cycle could then be repeated so that the 16 channels are repeatedly cycled in the PIP areas on top of the main display 138.

All 4 PIP display areas can be updated with a new channel at the same time or can be updated one at a time in a scroll display mode. In a horizontal scroll display mode a horizontal row of 4 PIP display areas all move to the right one space, the right most PIP display disappears and a new PIP display appears as a leftmost PIP display area in the horizontal row of PIP displays. The user can view four channels at a time in parallel in 4 PIP display areas and have the channels scanned for a predetermined period of time, for example, 5 seconds. If the user sees a channel in a particular PIP he wants to pick for the main display area or for potentially showing on the main display at a later time, the user can click once on that particular PIP display area to select the channel displayed in the PIP display area 140. That channel from PIP display area 140 will be continuously displayed in a new PIP display area 141 and removed from the group of channels being displayed in the 5 second scan cycle. The channel selected to be moved from PIP display 140 to PIP display 141 is removed from the set of channels that are being scanned in the PIP displays 140, 142, 144, and 146. If the selected channel appearing in the newly created PIP display 141 is selected or "clicked on", that channel becomes the main display in main display area 138.

In an illustrative embodiment, there are two STBs, STB1 102 and STB2 103 in the home. While a user is watching TV at STB1 and holds down UP button on the RC 145, a channel scan request from the RC to STB1 is initiated. If the scan request is a multicast scan, STB1 issues a multicast join to the modem. If that channel (e.g., CNN) is already being watched in the home, for example at STB2, then the CNN multicast is already being delivered to the home modem 118. In this case, where the CNN multicast is already being delivered to the home, then the modem 118 can duplicate that CNN traffic from the CNN multicast delivered to STB2 103 and deliver it to the STB1 102.

If no one in the home (STB1 or STB2) is watching CNN, then the multicast join request goes to the DSLAM 114. If someone in the neighborhood serviced by DSLAM 114 is watching CNN, then the CNN multicast is being delivered to the DSLAM 114 and the DSLAM 114 can duplicate the CNN multicast at the DSLAM 114 and deliver it to STB1 102 through the modem 118. If no one is watching CNN in the neighborhood then the multicast join request will go back to switch 105 to determine if someone in one of a multiplicity of neighborhoods serviced by switch 105 is watching CNN. If someone is watching CNN in one of the neighborhoods serviced by the switch 105 the CNN multicast is available at the switch 105 and can be duplicated for delivery to the STB 102. If no one is watching CNN in one of the multiplicity of neighborhoods, the multicast join request will go to the router 104 and the CNN multicast 112 can be provided from a video head end 101 to the router.

The router 104 and the unicast origination point group of servers 108 are usually located in a metropolitan area. There is typically one router 104 and one unicast origination point group of servers 108 per metropolitan area. CNN is usually encoded for the entire nation at the video head end 101 and delivered as multicast to each metropolitan area router, such as router 104. The unicast origination point servers 108 and multicast router 104 are set up with buffers so that each multicast or unicast video stream is stored for a short period of time, for example, 20 seconds on a running basis at the router 104 or server 108. The temporary buffering or storage is useful for retransmission for dropped packets and for error correction. The buffering is also useful for supplying the most recent 10-20 seconds of video to an STB, for a channel scan.

A multicast join request is a network function and a unicast join request is a server function. Programs or channels of national interest are provided by the video head end to all routers such as router 104. Programs of regional or local interest are provided by server 108 to router 104. If a user wants to perform a unicast based channel scan, the user at a client device, i.e. an STB, will directly request a unicast join from one of the unicast servers. The STB will issue a request to a server 108 and request, for example, 5 seconds of content for the unicast. The server will send the latest 5 seconds buffered to the STB and the STB will play that 5 seconds or less of content for a channel scan of CNN. A multiplicity of channels, for example 16 channels can be requested and 16 (MPEG-4.10 or H.264) multicast or unicast video streams can be sent to the STB. Channels provided via unicast and multicast can be requested and joined in a parallel channel scan.

In an illustrative embodiment, a user or STB can create scan modes from the RC or STB so that a subset of channels is presented in a scan. For example, there may be 300 channels, but a favorites scan mode can be entered where only the current user's 40 favorite or most watched channels are presented in the scan. The favorites scan mode can be personalized to the current user based on account identifier or sub account identifier. Several scan modes can be generated or entered, including but not limited to, sports, news, drama and other categorical groupings. For each of these scan modes, a complimentary EPG mode can be entered so that only those channels in the scan mode are presented in the EPG. For example, a favorites scan mode would request and scan sets or subsets of channels selected from favorites channels indicated by the user or STB. Similarly, a sports, news and drama scan mode can be implemented, scanning channels selected under these scan modes. The user or the STB can select channels to be entered in a guide or scan mode. The STB monitors user activity and identifier and has access to channel type in the EPG. Thus the STB can automatically create the scan modes.

The PIP screens can be scrolled horizontally across the bottom of the video display screen. In the horizontal scroll display mode, the most recent PIP appears as the left most PIP and the other PIPS shift to the right with the rightmost PIP screen no longer being displayed. The video streams can be delivered as a H.264 or H-4.10 video stream. The PIP streams utilize relatively low resolution, about 400 Kbits per second of bandwidth. Normal resolution background video streams utilize approximately 1.6 mbits per second bandwidth.

A unicast stream includes a single program or channel sent to the STB. The single program or channel can be delivered in high or normal resolution for display on the main video display or in lower resolution for a PIP display.

Figure 2:
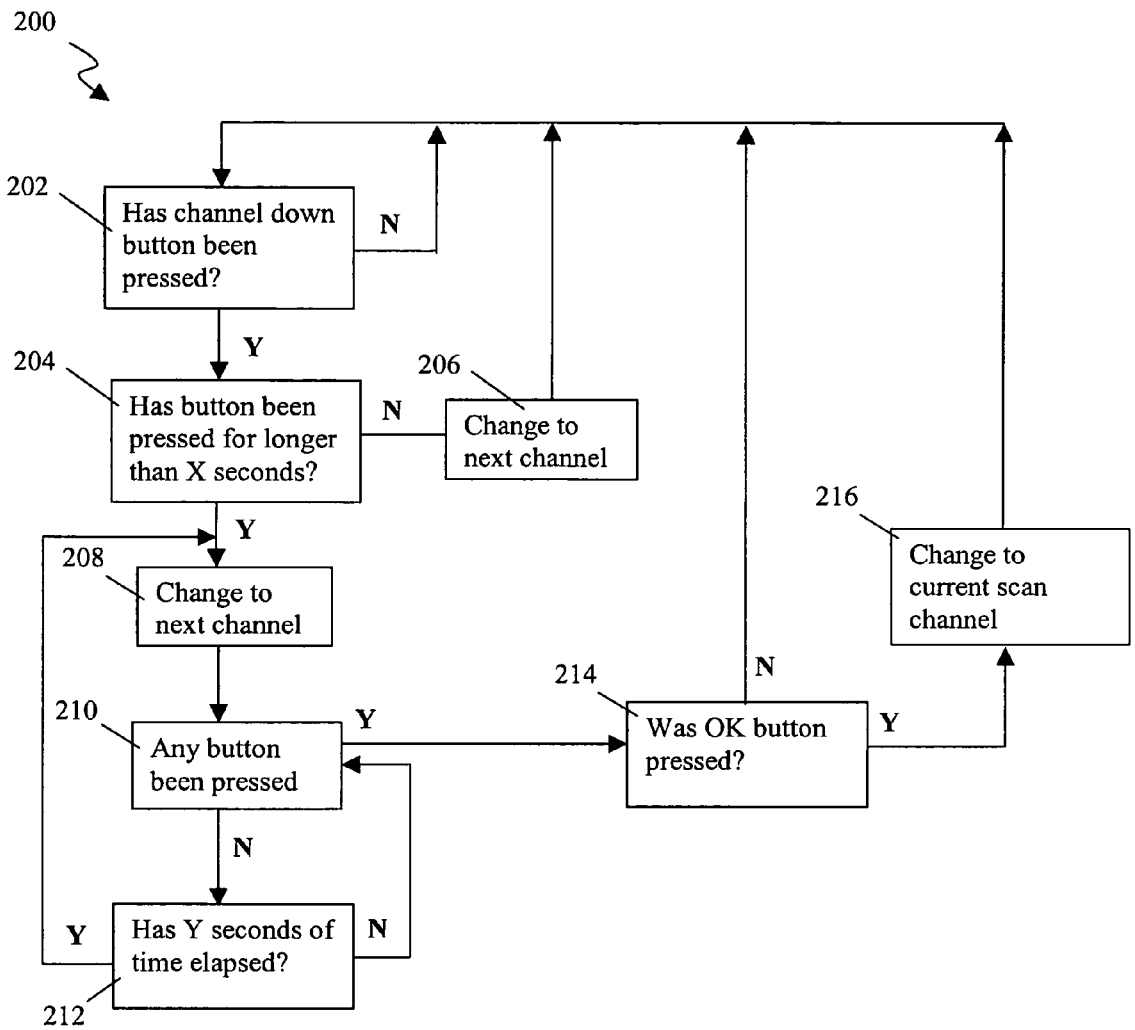
FIG. 2 is a flowchart depicting of an illustrative embodiment showing scanning.

Turning now to FIG. 2, FIG. 2 is a flow chart depicting a method for surfing or scanning a main video stream (higher resolution) as well as a PIP video stream (lower resolution). The system and method determine if the channel down button has been pressed at block 202 and continues on to block 204 if yes. If no, the system continues to change to current scan channel at block 216. The system determines if the channel down button has been pressed for longer than a predetermined time, for example, 2 seconds at block 204 and continues on to block 208 if yes. If no, the system continues to change to the next channel at block 206. The system determines if any button has been pressed at block 210 and continues to block 214 if yes. The system determines if the OK button was pressed at block 214. If the system determines that no button has been pressed at block 210 it continues on to block 212 to determine if Y seconds of time elapsed and returns to block 208 if yes. If no, the system returns to block 210.

Figure 3:
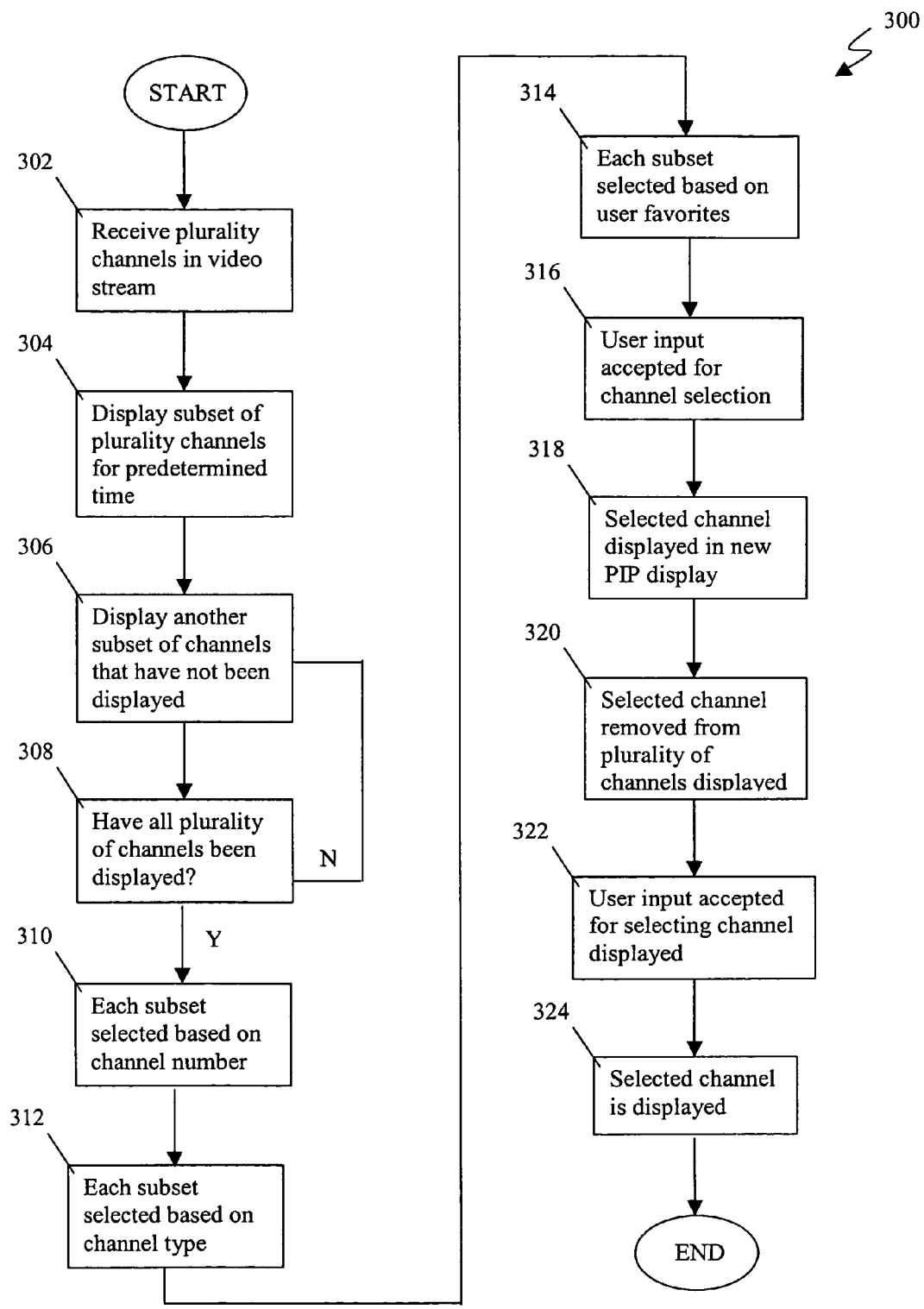
FIG. 3 is a flowchart depicting of a particular embodiment showing scanning a group of channels in parallel.

Turning now to FIG. 3, FIG. 3 is a flow chart depicting a method for receiving a group of channels and scanning the group or a subset of the group of channels in parallel. Channels selected for scanning are placed in a display set. The term channels, as used herein, is used to refer to multiple programs, content selections, video or audio selections contained in video streams. In an illustrative embodiment, a user requests a group of channels for scanning. The group of channels may consist of but is not limited to, all available television channels, favorite channels, recently viewed channels, channels usually viewed by the user at the corresponding time and channels by type/category (e.g., sports, news, etc.). The channels in the video stream are received at block 302. The display set or subset of channels is displayed in parallel in PIP displays for a predetermined time at block 304. Another subset (display set) of channels, if any, that have not yet been displayed in the current scan is displayed at block 306. The system determines if all channels in the group have been displayed at block 308. If all channels in the group have not been displayed, the process is repeated at block 308. If all channels have been displayed, the system continues to block 310 where each subset or display set is selected based on channel number, or to block 312, where each subset is selected based on channel type, or to block 314, where each subset is selected based on user favorites or scan mode. Other types of categories for selecting channels are available as well. User input is accepted for channel selection from a PIP scan at block 316. The selected channel from a PIP scan is displayed continuously in a new PIP display created at block 318 and no longer scanned. The selected channels from the PIP scan is removed from the group of scanned channels displayed at block 320. User input is accepted for selecting channel displayed at block 322. The selected channel is displayed at block 324 and the process ends.

Figure 4:
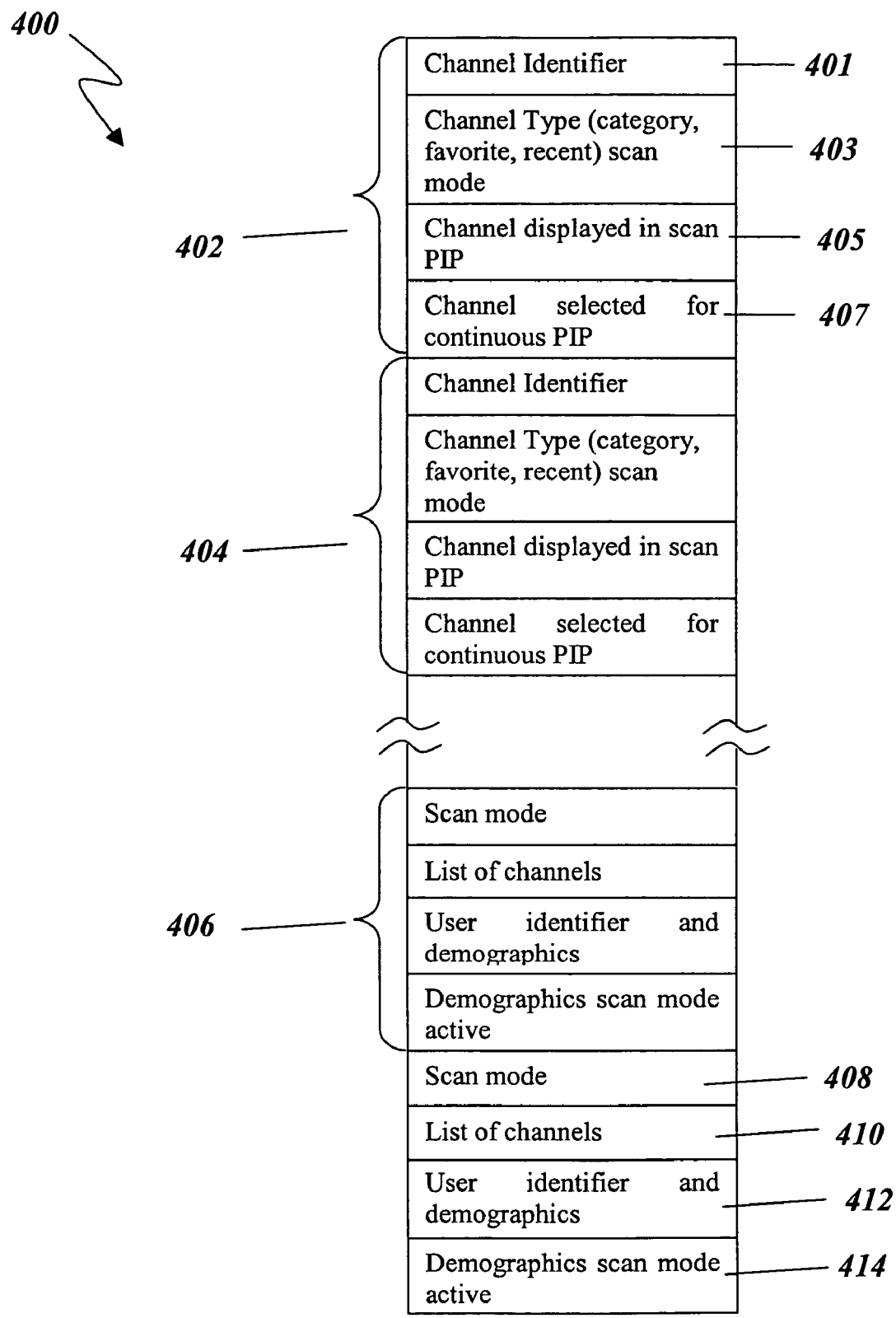
FIG. 4 is an illustration of a data structure for storing scanning channel information in an illustrative embodiment.

Turning now to FIG. 4, FIG. 4 illustrates a data structure 400 provided in an illustrative embodiment. The data structure can be stored in STB memory or server memory. Each available channel is identified by a channel attribute set 402, 404, and 406. Each channel attribute set contains fields for a channel identifier 401, a channel type, for instance, category, favorite, or recently viewed, 403, a channel displayed in scan PIP 405, and a channel selected for continuous PIP 407. The data structure also contains fields for a list of scan modes 408 and a list of channels contained in each of the scan modes 410. The data structure also contains fields for user identifier and demographics 412 and which scan mode is active 414. The channel identifiers are used to identify channels in a video stream when the STB requests channels in a multicast of unicast stream for scanning and/or display. The channel type is used to group scanned channels to be requested or displayed in PIPS in parallel. For example, channels or programs can be grouped together for parallel PIP area displays of a group of sports channels, new channels, favorites or recently viewed channels. The group of channels would be displayed together so that subsets of all sports programs would be displayed together until all sports channels are scanned. Then subsets of all news programs would be grouped together and displayed until all news channels are scanned. A heading or caption can be displayed over, under, or otherwise adjacent the PIP scan changes, the caption changes, for example, from a caption such as "NEWS" to a caption such as "SPORTS" or favorites.

The number of PIP display areas displayed can vary with the number of channels in a display set or group subset for display. Thus if there are 4 channels in one subset (display set) of channels, they are displayed in 4 PIP area displays and if there are 3 channels in another subset (display set) of channels, they are displayed in 3 PIP area displays. The number of PIPS can be increased or decreased to matrix a number of channels for display. Demographics for an IPTV user or sub-user account can be used to further restrict a scan of channels that match the demographic. For example, NASCAR may be selected for a man's sports scan and women's basketball selected for a woman's sports scan to be included in a scan.

Figure 5:
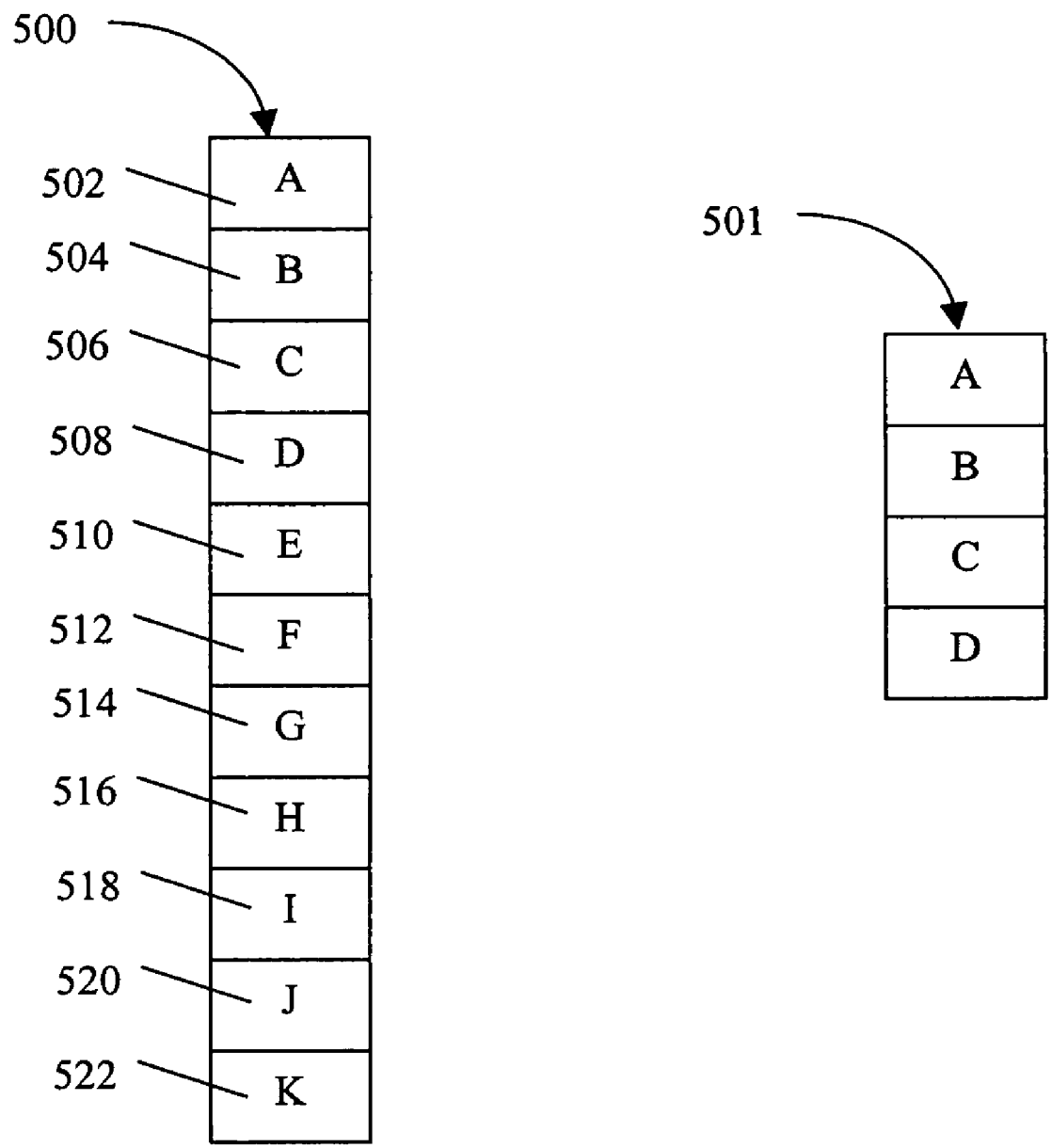
FIG. 5 is an illustration of a plurality of channels and a display set of channels.

Turning now to FIG. 5, FIG. 5 shows a group of channels 500 are selected fro scanning. From this group, a display set 501 is selected. When the group 500 is larger than the display set 501, the display set is a subset of the group. The display set of channels can be chosen from the group of channels based on a scan mode.

Each channel in the display set or group can be individually chosen to be delivered in a unicast or multicast video stream for display and scanning.

Figure 6:
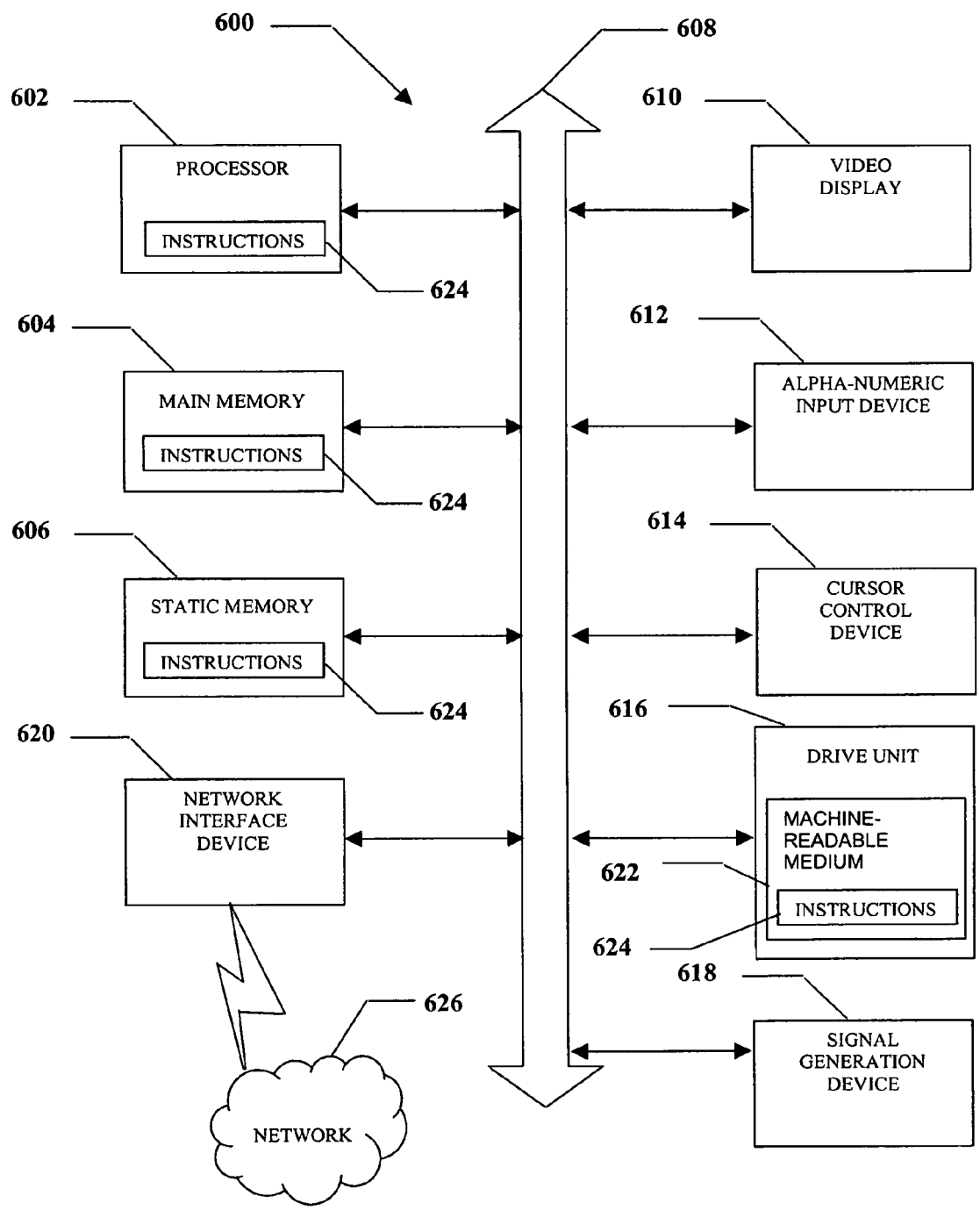
FIG. 6 is a diagrammatic representation of a machine in the form of a computer system within which a set of instructions, when executed, may cause the machine to perform any one or more of the methodologies of the illustrative embodiment.

Turning now to FIG. 6, FIG. 6 is a diagrammatic representation of a machine in the form of a computer system 600 within which a set of instructions, when executed, may cause the machine to perform any of one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the illustrative includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602. (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 512 (e.g., a keyboard), a cursor control device 614 (e.g., a mouse), a disk drive unit 616, a signal generation device 618 (e.g., a speaker or remote control) and a network interface device 420.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the illustrative embodiment, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrative embodiment contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the illustrative embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the illustrative embodiment is considered to include any one or more of a machine-readable medium or a distribution medium, as listed herein and including art-recognized equivalents and successor media, in which the software implementations herein are stored.

Turning now to FIG. 7, a depiction of logic modules on a processor in an illustrative embodiment of the present invention is shown. As shown in FIG. 7, processor 130 comprises a first logic module 701 for receiving the plurality of channels from an internet protocol television (IPTV) system at the STB; a second logic module 702 for selecting a display set from the plurality of channels as the display subset of channels; and a third logic module 703 for communicating with a display device for displaying each one of the channels in the display set in parallel in a separate one of a plurality of picture in picture (PIP) displays for a predetermined time; a fourth logic module 704 for accepting a user input for selecting a channel displayed in one of the plurality of PIP displays; a fifth logic module 705 for sending a communication to the display device for displaying the selected channel in a new PIP display; and a sixth logic module 706 for removing the selected channel from the plurality of channels for selecting the display set.

Figure 8:
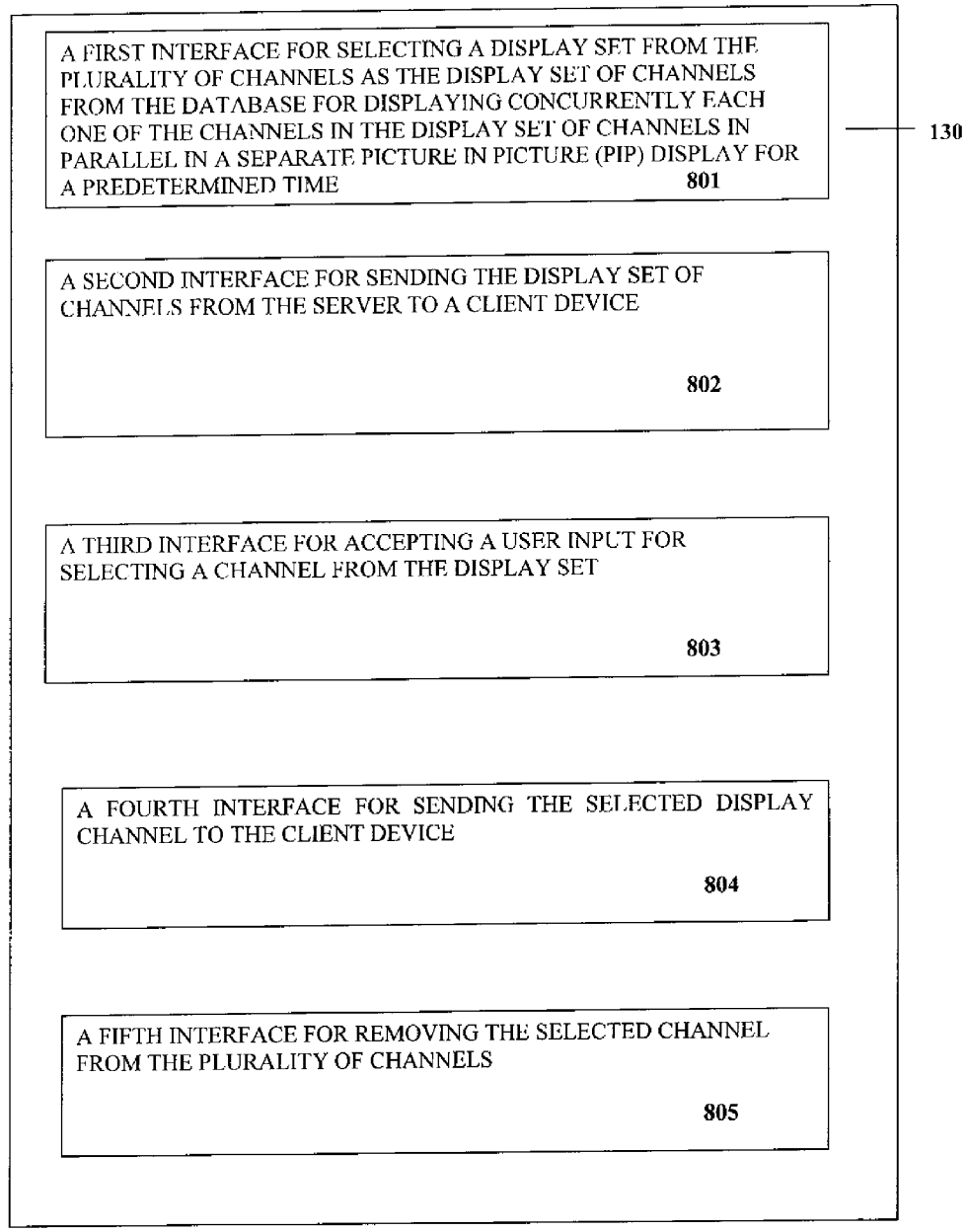
FIG. 8 is a depiction of interfaces on a processor in an illustrative embodiment of the present invention.

Turning now to FIG. 8, a depiction of logic modules on a processor in an illustrative embodiment of the present invention is shown. Processor 130 comprises a first interface 801 for selecting a display set from the plurality of channels as the display set of channels from the database for displaying concurrently each one of the channels in the display set of channels in parallel in a separate picture in picture (PIP) display for a predetermined time; and a second interface 802 for sending the display set of channels from the server to a client device; a third interface 803 for accepting a user input for selecting a channel from the display set; a fourth interface 804 for sending the selected display channel to the client device; and a fifth interface 805 for removing the selected channel from the plurality of channels.

Although the present specification describes components and functions implemented in the embodiments with reference to particular standards and protocols, the illustrative embodiment is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "illustrative embodiment" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Although the illustrative embodiment has been described with reference to several illustrative embodiments, it is understood that the words that have been used are words of description and illustration, rather than words of limitation. Changes may be made within the purview of the appended claims, as presently stated and as amended, without departing from the scope and spirit of the illustrative embodiment in its aspects. Although the illustrative embodiment has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present illustrative embodiment, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

The invention claimed is:

1. A method for scanning a plurality of video channels in parallel, the method comprising:
receiving a video stream at a set top box (STB) from an internet protocol television (IPTV) server;
receiving the plurality of video channels at the (STB);
selecting a display set from the plurality of channels;
sending a communication to a display for displaying each channel in the display set in parallel wherein each one of the channels in the display set is displayed in one of a plurality of picture in picture (PIP) displays for a predetermined time;
accepting a user input for selecting a channel displayed in one of the plurality of PIP displays;
sending a communication to the display for displaying the selected channel in a new PIP display; and
removing the selected channel from the plurality of video channels for selecting a display set.

2. The method of claim 1, further comprising:
selecting a second display set from the plurality of channels; and
sending a communication to a display for displaying each channel in the display set in parallel wherein each one of the channels in the second display set is displayed in one of a plurality of picture in picture (PIP) displays for a predetermined time.

3. The method of claim 1, wherein the display set is selected based on a scan mode, selected from the set consisting of channel type, favorites and recently viewed channels.

4. The method of claim 1, further comprising:
accepting a user input for selecting a channel displayed in one of the PIP displays; and
sending a communication to the display for displaying the selected channel in a main display.

5. The method of claim 1, further comprising:
sending a communication to the display for horizontally scrolling through the plurality of channels through the plurality of PIP displays.

6. The method of claim 1, wherein a number of channels in the display set varies and a number of PIP displays in the plurality of PIP displays varies to match the number of channels in the display set.

7. A system for scanning a plurality of video channels in parallel comprising:
a set top box (STB) containing a processor; and
a first logic module for receiving the plurality of channels from an internet protocol television (IPTV) system at the STB;
a second logic module for selecting a display set from the plurality of channels as the display subset of channels; and
a third logic module for communicating with a display device for displaying each one of the channels in the display set in parallel in a separate one of a plurality of picture in picture (PIP) displays for a predetermined time;
a fourth logic module for accepting a user input for selecting a channel displayed in one of the plurality of PIP displays;
a fifth logic module for sending a communication to the display device for displaying the selected channel in a new PIP display; and
a sixth logic module for removing the selected channel from the plurality of channels for selecting the display set.

8. The system of claim 7, further comprising:
a computer readable medium embedded in a memory accessible to the processor, containing a computer program, the computer program comprising:
instructions to select the display set based on a scan mode selected from the set consisting of channel type, favorites and recently viewed channels.

9. The system of claim 7, wherein the computer program further comprises:
instructions to provide a number of PIP displays to match a number of channels in the display set.

10. A data structure embedded in a computer readable medium, the data structure containing data for defining a plurality of channels for scanning the plurality of channels in parallel, the data structure comprising:
a channel identifier field for identifying a channel in a video stream; and
a channel type for characterizing a channel category, as a member of the plurality of channels, wherein each one of the channels will be displayed concurrently in a different PIP display; and
a channel selected for continuous scan field to indicate whether a channel has been selected for continuous display in a PIP and removed from the plurality of channels for selecting a display set.

11. The data structure of claim 10 further comprising:
a channel displayed in PIP field to indicate whether a channel is displayed in a PIP.

12. The data structure of claim 10 further comprising:
a scan mode field for indicating a scan mode; and
a list of channels field for identifying a list of channels in the scan mode.

13. A system for scanning a plurality of video channels in parallel, the system comprising:
a server containing a processor;
a database accessible to the processor;
the processor further comprising:
a first interface for selecting a display set from the plurality of channels as the display set of channels from the database for displaying concurrently each one of the channels in the display set of channels in parallel in a separate picture in picture (PIP) display for a predetermined time; and
a second interface for sending the display set of channels from the server to a client device;
a third interface for accepting a user input for selecting a channel from the display set;
a fourth interface for sending the selected display channel to the client device; and
a fifth interface for removing the selected channel from the plurality of channels.

* * * * *